United States Patent
Shachar et al.

(10) Patent No.: US 12,282,551 B2
(45) Date of Patent: Apr. 22, 2025

(54) DETECTION OF ANOMALOUS BACKUP FILES USING KNOWN ANOMALOUS FILE FINGERPRINTS

(71) Applicant: EMC IP Holding Company LLC, Hopkinton, MA (US)

(72) Inventors: Tomer Shachar, Omer (IL); Maxim Balin, Gan-Yavne (IL); Yevgeni Gehtman, Modi'in (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 740 days.

(21) Appl. No.: 17/308,113

(22) Filed: May 5, 2021

(65) Prior Publication Data

US 2022/0358215 A1    Nov. 10, 2022

(51) Int. Cl.
*G06F 21/56*   (2013.01)
*G06F 11/14*   (2006.01)
*G06F 16/11*   (2019.01)

(52) U.S. Cl.
CPC ........ *G06F 21/562* (2013.01); *G06F 11/1451* (2013.01); *G06F 16/11* (2019.01); *G06F 21/568* (2013.01); *G06F 2201/80* (2013.01); *G06F 2201/82* (2013.01); *G06F 2221/033* (2013.01); *G06F 2221/2115* (2013.01)

(58) Field of Classification Search
None
See application file for complete search history.

(56) References Cited

U.S. PATENT DOCUMENTS

| | | | |
|---|---|---|---|
| 8,099,605 B1* | 1/2012 | Billsrom | H04L 69/40 726/28 |
| 8,667,591 B1* | 3/2014 | Claudatos | G06F 21/564 726/24 |
| 10,970,395 B1* | 4/2021 | Bansal | G06F 21/566 |
| 11,520,907 B1* | 12/2022 | Borowiec | G06F 3/067 |
| 2015/0067860 A1* | 3/2015 | Levow | H04L 63/145 726/24 |
| 2017/0177867 A1* | 6/2017 | Crofton | G06F 21/565 |

(Continued)

OTHER PUBLICATIONS https://www.carbonite.com/blog/article/2020/06/antivirus-and-backup-why-you-need-both, downloaded on Apr. 21, 2021.

(Continued)

*Primary Examiner* — Simon P Kanaan
(74) *Attorney, Agent, or Firm* — Ryan, Mason & Lewis, LLP

(57) ABSTRACT

Techniques are provided for detection of anomalous backup files using known anomalous file fingerprints (or other file-dependent values such as hash values, signatures and/or digest values). One method comprises obtaining first file-dependent values corresponding to respective known anomalous files; obtaining a second file-dependent value for a stored backup file; comparing the second file-dependent value to the first file-dependent values; and performing an automated remedial action in response to a result of the comparing. The second file-dependent value for the stored backup file may be determined by a backup server in response to a source file corresponding to the stored backup file being backed up by the backup server, and may be stored as part of metadata associated with the stored backup file.

20 Claims, 6 Drawing Sheets

(56) References Cited

U.S. PATENT DOCUMENTS

2017/0308420 A1* 10/2017 Korotaev ............ G06F 11/0763
2018/0359272 A1* 12/2018 Mizrachi ............... H04L 67/535

OTHER PUBLICATIONS https://www.microtechboise.com/our-services/antivirus-and-backups/, downloaded on Apr. 21, 2021.
https://www.handybackup.net/antivirus.shtml, downloaded on Apr. 21, 2021.

* cited by examiner

DETECTION OF ANOMALOUS BACKUP FILES USING KNOWN ANOMALOUS FILE FINGERPRINTS

FIELD

The field relates generally to information processing techniques and more particularly, to the protection of data in such information processing systems.

BACKGROUND

Malicious software or "malware" comprises software used to interfere with computer system operations, gain unauthorized access to computer systems, acquire private or otherwise sensitive information, display unwanted advertising, or conduct any other harmful activities. Malware can take the form of executable code, scripts, active content, and other software.

A computer network typically incorporates malware detection procedures and other security functionality to protect the computers and other devices of the network against malware and other malicious activity. In a backup system, however, there is typically no active functionality to detect malicious files stored within the backup system.

A need therefore exists for techniques for detecting anomalous backup files.

SUMMARY

In one embodiment, a method comprises obtaining a plurality of first file-dependent values corresponding to respective known anomalous files; obtaining at least one second file-dependent value for at least one stored backup file; comparing the at least one second file-dependent value to the plurality of first file-dependent values; and performing one or more automated remedial actions in response to a result of the comparing.

In at least some embodiments, a given first file-dependent value and/or the at least one second file-dependent value may comprise a fingerprint. Other examples of the first file-dependent values and/or the at least one second file-dependent value comprise a hash value, a signature and/or a digest value.

In one or more embodiments, the at least one second file-dependent value for the at least one stored backup file is determined by a backup server in response to a source file corresponding to the at least one stored backup file being backed up by the backup server. The at least one second file-dependent value for the at least one stored backup file can be stored as part of metadata associated with the at least one stored backup file in connection with a backup of a source file corresponding to the at least one stored backup file.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detection of anomalous backup files using known anomalous file fingerprints (or other file-dependent values such as hash values, signatures and/or digest values).

As noted above, a backup system typically does not have active functionality to detect malicious files stored within the backup system (for example, to avoid a performance degradation). For example, at the time one or more files are backed up to a storage system, a particular backup file may unknowingly include malicious or otherwise anomalous software. The particular backup file can thereafter be restored at a later time and the malicious software that was dormant within the backup file may become active. When a signature becomes available for the malicious or otherwise anomalous file, e.g., subsequent to storage of the anomalous file in the backup system, there is currently no mechanism for evaluating the previously backed up files to see if they contain the malicious or otherwise anomalous file.

Figure 1:
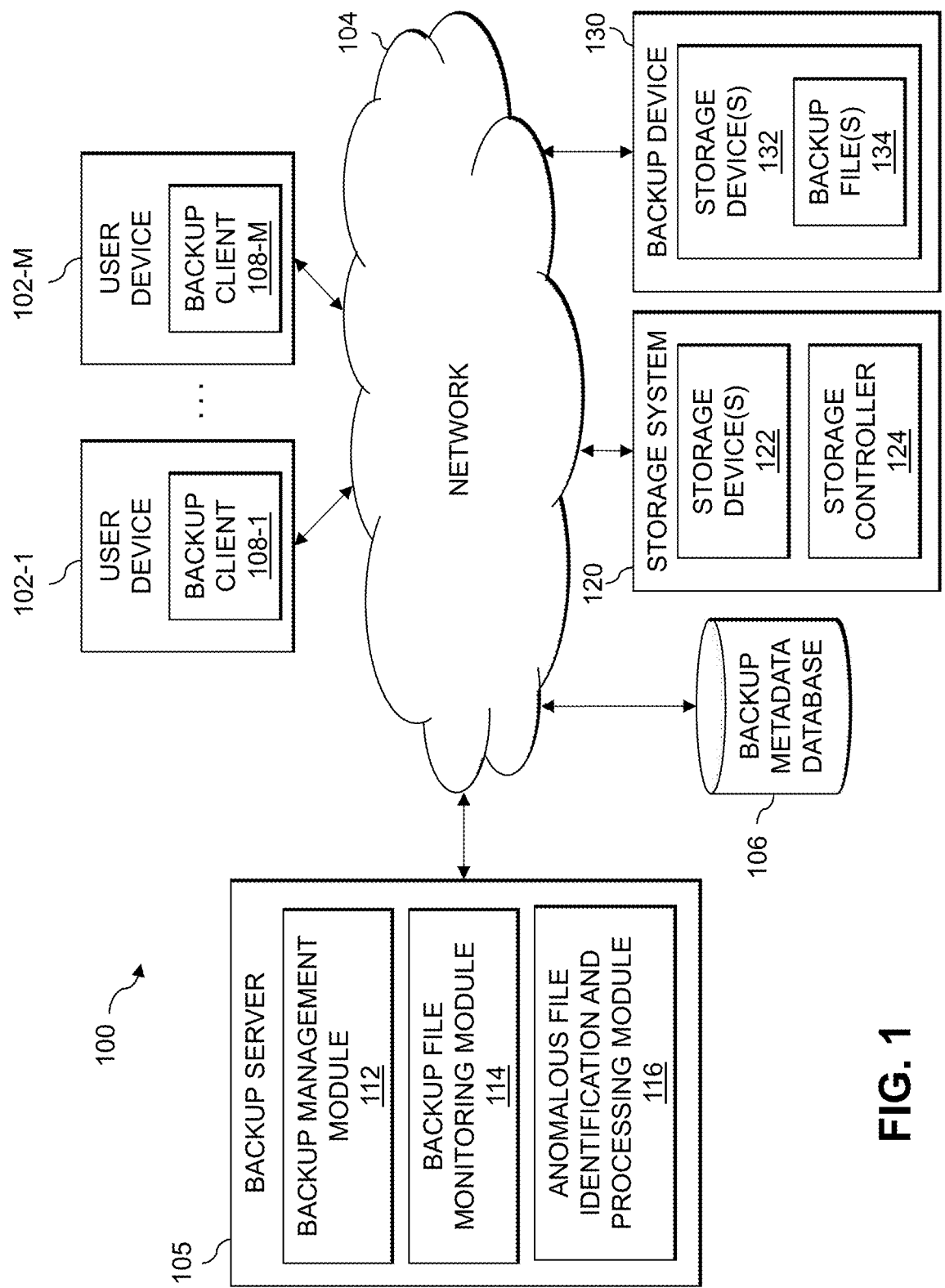
FIG. 1 illustrates a computer network configured for detection of anomalous backup files using known anomalous file fingerprints in accordance with an illustrative embodiment.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a backup server 105, a backup metadata database 106, a storage system 120 and one or more backup devices 130.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by the storage system 120. The term "input-output" as used herein refers to at least one of input and output. For example, IO operations may comprise write requests and/or read requests directed to logical addresses of a particular logical storage volume of the storage system 120. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

The storage system 120 illustratively comprises processing devices of one or more processing platforms. For example, the storage system 120 can comprise one or more processing devices each having a processor and a memory, possibly implementing virtual machines and/or containers, although numerous other configurations are possible.

The storage system 120 can additionally or alternatively be part of cloud infrastructure such as an Amazon Web Services (AWS) system. Other examples of cloud-based systems that can be used to provide at least portions of the storage system 120 include Google Cloud Platform (GCP) and Microsoft Azure.

The user devices 102 and the storage system 120 may be implemented on a common processing platform, or on separate processing platforms. The user devices 102 (for example, when implemented as host devices) are illustratively configured to write data to and read data from the storage system 120 in accordance with applications executing on those host devices for system users.

The storage system 120 comprises a plurality of storage devices 122 and an associated storage controller 124. The storage devices 122 store data of a plurality of storage volumes, such as respective logical units (LUNs) or other types of logical storage volumes. The term "storage volume" as used herein is intended to be broadly construed, and should not be viewed as being limited to any particular format or configuration.

The storage devices 122 of the storage system 120 illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated numerous different types of storage devices 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The user devices 102 are configured to interact over the network 104 with the storage system 120. Such interaction illustratively includes generating IO operations, such as write and read requests, and sending such requests over the network 104 for processing by the storage system 120. In some embodiments, each of the user devices 102 comprises a multi-path input-output (MPIO) driver configured to control delivery of IO operations from the host device to the storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 120.

The MPIO driver may comprise, for example, an otherwise conventional MPIO driver, such as a PowerPath® driver from Dell Technologies. Other types of MPIO drivers from other driver vendors may be used.

The storage controller 124 and the storage system 120 may further include one or more additional modules and other components typically found in conventional implementations of storage controllers and storage systems, although such additional modules and other components are omitted from the figure for clarity and simplicity of illustration.

The storage system 120 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 120 in such an embodiment collectively comprise at least a portion of the storage controller 124 of the storage system 120. For example, in some embodiments the sets of processing modules of the storage nodes collectively comprise a distributed storage controller of the distributed storage system 120. A "distributed storage system" as that term is broadly used herein is intended to encompass any storage system that, like the storage system 120, is distributed across multiple storage nodes.

Each storage node of a distributed implementation of storage system 120 illustratively comprises a CPU or other type of processor, a memory, a network interface card (NIC) or other type of network interface, and a subset of the storage devices 122, possibly arranged as part of a disk array enclosure (DAE) of the storage node. These and other references to "disks" herein are intended to refer generally to storage devices, including SSDs, and should therefore not be viewed as limited to spinning magnetic media.

The storage system 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the storage system 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system 120 to reside in different data centers. Numerous other distributed implementations of the user devices and the storage system 120 are possible.

The backup server 105 may be implemented using one or more nodes to obtain, store and/or manage client backup files. In some embodiments, the backup server 105 may be implemented, at least in part, using the Dell EMC Avamar Data Protection Software, or portions thereof, commercially available from Dell Technologies. As shown in FIG. 1, the exemplary backup server 105 comprises a backup management module 112, a backup file monitoring module 114 and an anomalous file identification and processing module 116.

As discussed hereinafter, in one or more embodiments, the backup management module 112 manages the file backup process and may perform deduplication, restoration and other backup functions. The exemplary backup file monitoring module 114 monitors the backup files stored by the backup server 105 and may maintain the metadata associated with each backup file. In at least some embodiments, the anomalous file identification and processing module 116 performs a scan of stored backup files, by comparing signatures of the stored backup files to signatures of known anomalous files, to identify one or more anomalous stored backup files (e.g., malicious stored backup files).

It is to be appreciated that this particular arrangement of modules 112, 114 and 116 illustrated in the backup server 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors and/or memory elements can be used to implement different ones of modules 112, 114 and 116 or portions thereof. At least portions of modules 112, 114 and 116 may be implemented at least in part in the form of software that is stored in memory and executed by a processor.

It is further noted that the functionality of backup server 105 or portions thereof may be implemented by one or more of the user devices 102 and/or the storage controller 124 in other embodiments, as would be apparent to a person of ordinary skill in the art.

In the example of FIG. 1, the backup server 105 has an associated backup device 130 that comprises one or more backup storage devices 132, in a similar manner as the storage devices 122, for storing one or more backup files 134. In a further variation, some or all of the one or more backup storage devices 132 may be a part of the storage system 120. The backup files 134 may be any file type, such as a database, a text document, an audio file, a video file, or any other type of data. The backup device 130 may also comprise an anomalous file identification and processing module 116 (or portions of the functionality thereof), in addition to, or instead of, the anomalous file identification and processing module 116 shown in the backup server 105 of FIG. 1.

In addition, each of the user devices 102 to be backed up includes a corresponding backup client 108-1 through 108-M (e.g., a backup agent). In some embodiments, the backup server 105 is configured to create, or cause the creation of, one or more backup files that are resident on the user device 102 associated with a particular backup client 108. In general, a backup client 108 (or agent) can execute on each computer, processing device, or server that is being backed up.

In addition, if it is desired to back up the storage system 120, or portions thereof, the storage system 120 will also include one or more backup clients 108. In this manner, the backup server 105 can be configured to create, or cause the creation of, one or more backup files that are resident on the storage system 120 associated with a particular backup client 108. The backup clients 108 may be used to browse, back up, and/or restore files or directories on a specific file system of a user device 102 and/or storage system 120.

The backup server 105 cooperates with the backup client 108 to generate one or more backup files 134. The backup files 134 can include full backup files, incremental backup files, and/or other types of backup configurations. When a restore operation is performed, the backup server 105 can identify and restore one or more specific backup files from among the backup files 134.

Additionally, the backup server 105 and/or the backup device 130 can have an associated backup metadata database 106 configured to store metadata for each stored backup file, such as a signature, a digest value, a fingerprint and/or a hash value (e.g., a 20-byte SHA-1) of the corresponding stored backup file, and/or indexing information that relates to or describes the corresponding stored backup file in one example. Although the backup metadata database 106 is shown in FIG. 1 as a separate component, in other embodiments, an additional or alternative instance of the backup metadata database 106, or portions thereof, may be incorporated into the backup server 105 and/or the backup device 130. The indexing information may describe the content of the corresponding stored backup file. The indexing information may describe or identify each corresponding stored backup file (e.g., file name, size, type), a location of each corresponding stored backup file (e.g., on the client and/or in the storage of the backup device 130), a timestamp, a path name, a client name or identifier, etc.

The signatures, digest values, fingerprints and/or hash values of the corresponding stored backup file stored in the metadata within the backup metadata database 106 of the FIG. 1 example may be used to avoid storing redundant data, for example, by a deduplication process. In addition, as noted above, the anomalous file identification and processing module 116 performs a scan of stored backup files 134, by comparing signatures (or another file-dependent value) of the stored backup files 134 to signatures of known anomalous files, to identify one or more anomalous stored backup files (e.g., malicious stored backup files), as discussed further below in conjunction with FIG. 3.

In the example of FIG. 1, the metadata or indexing information is stored separately from the corresponding stored backup file, such as in the backup metadata database 106. In another example, the metadata for each stored backup file may be stored with the corresponding stored backup file, for example, within storage device 132 of the backup device 130.

The database 106 in the present embodiment is implemented using one or more storage systems 120 associated with the backup server 105 and/or the backup device 130. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the backup server 105 and/or the backup device 130 can be one or more input-output devices (not shown), which illustratively comprise keyboards, displays or other types of input-output devices in any combination. Such input-output devices can be used, for example, to support one or more user interfaces to the backup server 105, as well as to support communication between the backup server 105 and other related systems and devices not explicitly shown.

The backup server 105 in the FIG. 1 embodiment is assumed to be implemented using at least one processing device. Each such processing device generally comprises at least one processor and an associated memory, and implements one or more functional modules for controlling certain features of the backup server 105. More particularly, backup server 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface allows the user devices 102 and/or the backup server 105 to communicate over the network 104 with each other (as well as one or more other networked devices), and illustratively comprises one or more conventional transceivers.

It is to be understood that the particular set of elements shown in FIG. 1 for detection of anomalous backup files using known anomalous file fingerprints is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of backup server 105 in computer network 100 will be described in more detail with reference, for example, to the flow diagram of FIG. 4.

Figure 2:
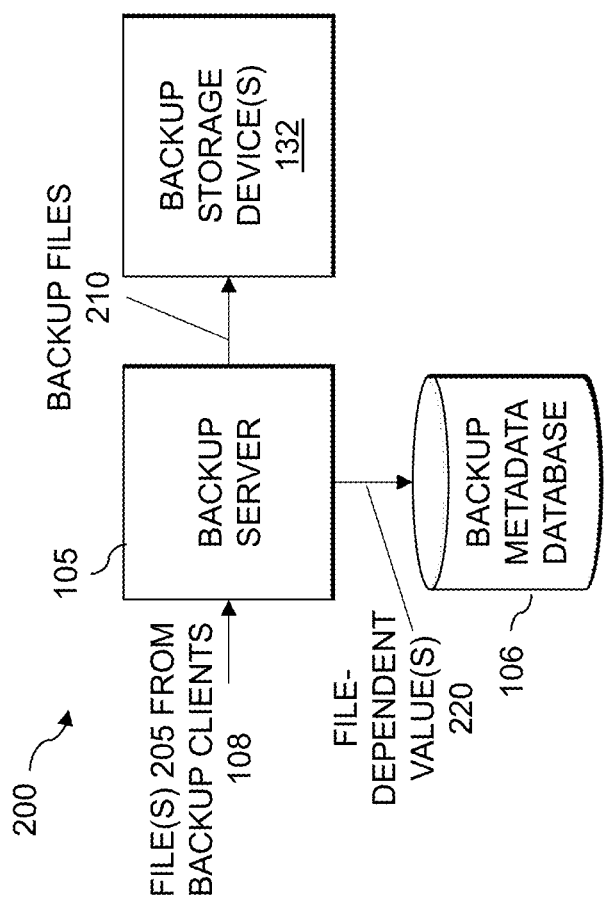
FIG. 2 illustrates a backup of files by the backup server of FIG. 1 in further detail, according to at least one embodiment.

FIG. 2 illustrates a backup 200 of files by the backup server 105 of FIG. 1 in further detail, according to at least one embodiment. In the example of FIG. 2, one or more files 205 (e.g., source files) from one or more backup clients 108, e.g., on a user device 102 and/or storage system 120, are processed by the backup server 105 and stored as backup files 210 in one or more of the backup storage devices 132. In addition, the backup server 105 stores a file-dependent value 220, such as a hash value, a signature, a digest value or a fingerprint, of each stored backup file 210 in the backup metadata database 106, in the manner described above. In another embodiment, the file-dependent values 220 can be stored as metadata directly with the corresponding backup file 210 in the backup storage device(s) 132. The file-dependent value 220 can be computed for the corresponding backup file 210 by the backup server 105, or by the source device or backup client 108 where the source files 205 were originally stored.

Figure 3:
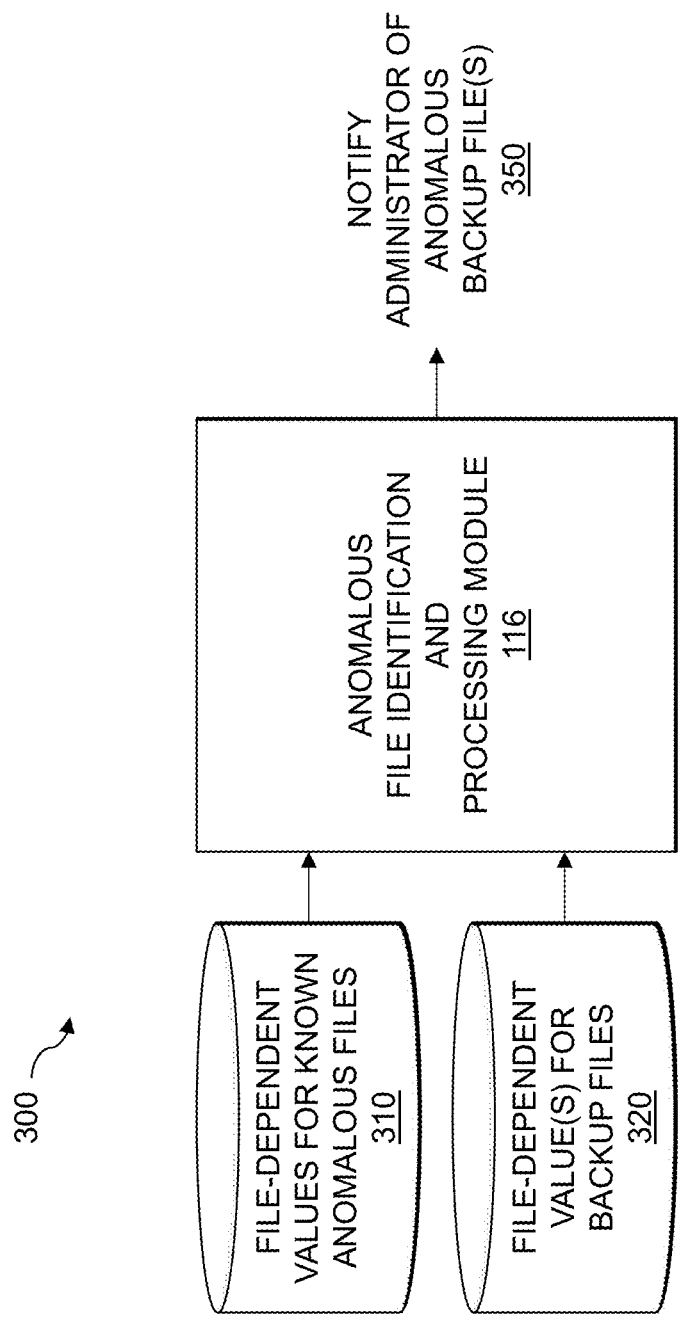
FIG. 3 illustrates an exemplary scanning of stored backup files by the backup server of FIG. 1 to identify one or more anomalous stored backup files, according to one or more embodiments.

FIG. 3 illustrates an exemplary scanning 300 of the stored backup files 134 by the backup server 105 of FIG. 1 to identify one or more anomalous stored backup files, according to one or more embodiments. In the example of FIG. 3, the anomalous file identification and processing module 116 obtains (i) one or more file-dependent values 310 for known anomalous files (for example, from a computer security vendor, such as a provider of antivirus software), and (ii) one or more file-dependent values 320 for stored backup files 134. The file-dependent values 310 for known anomalous files may be refreshed over time (for example, automatically, or upon an availability of an update to the file-dependent values 310 from the computer security vendor).

The exemplary anomalous file identification and processing module 116 performs a scan of the stored backup files 134, by comparing the file-dependent values 320 for stored backup files 134 to the file-dependent values 310 for known anomalous files, to identify one or more anomalous stored backup files (e.g., malicious stored backup files). The scan may be performed on a scheduled basis, and/or in response to a trigger event (e.g., before a restoration of one or more backup files 134).

Upon detection of an anomalous stored backup file by the anomalous file identification and processing module 116, the anomalous file identification and processing module 116 can send a notification 350 to an administrator of the anomalous stored backup file and/or perform another remedial (or mitigation) action to address the detected anomaly. For example, the performed remedial actions may comprise suspending a backup of at least one file, suspending a restore operation with respect to the at least one stored backup file and deleting the at least one stored backup file from a backup storage device. In further variations, the performed remedial actions may comprise isolating, removing, quarantining, limiting permissions, analyzing, and deactivating one or more of the user devices 102 and/or one or more files, accounts or aspects of the user devices 102 or the user; notifying one or more third party systems (such as sending an email, or generating an alert in another system); restricting access of one or more accounts and one or more machines from accessing a network, files or folders; initiating a step-up authentication with one or more additional authentication factors; resetting or limiting permissions associated with a file or folder; quarantining one or more files or folders, and preventing one or more further actions from being executed associated with the user devices 102, user account or machine associated with the detected anomalous backup file.

Figure 4:
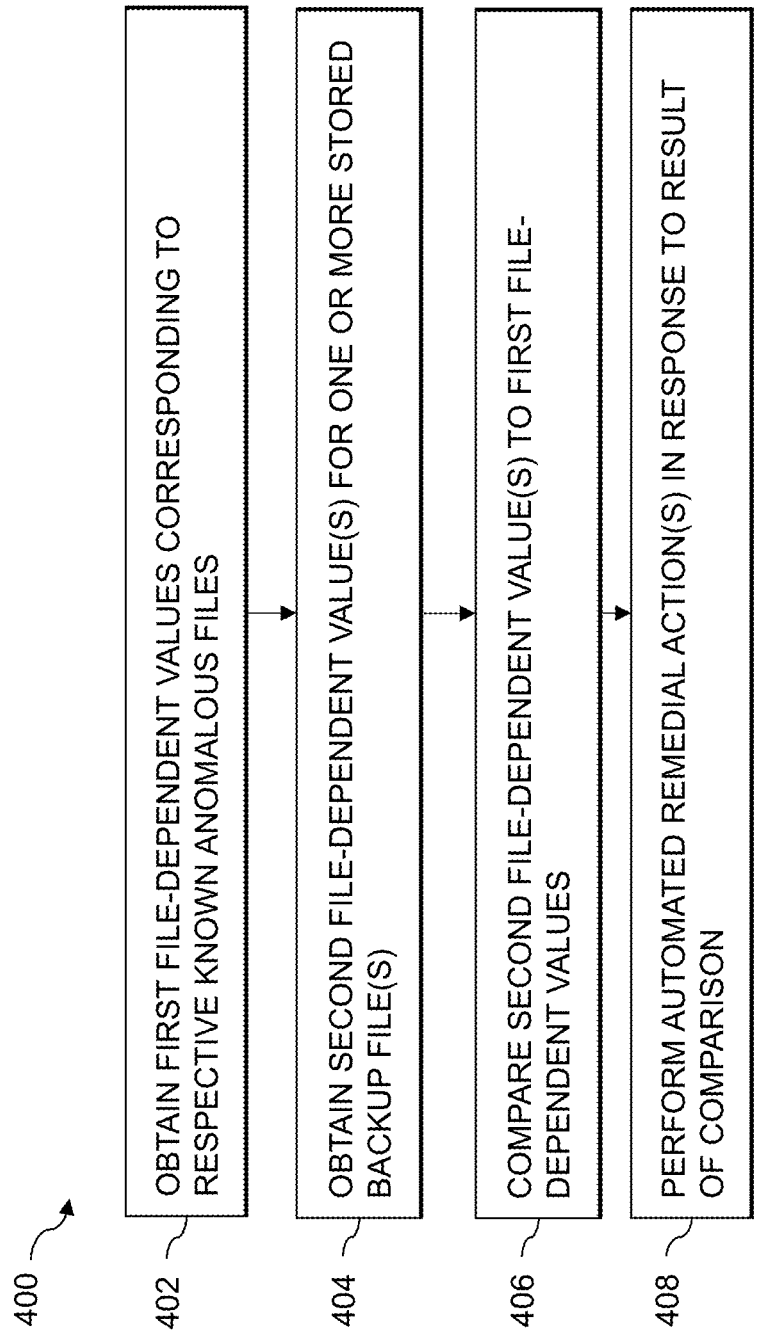
FIG. 4 is a flow diagram illustrating an exemplary implementation of an anomalous backup file detection process for detecting one or more anomalous backup files in a backup system, according to various embodiments.

FIG. 4 is a flow diagram illustrating an exemplary implementation of an anomalous backup file detection process 400 for detecting one or more anomalous backup files in a backup system, according to one embodiment of the disclosure. As shown in FIG. 4, the exemplary anomalous backup file detection process 400 initially obtains first file-dependent values corresponding to respective known anomalous files in step 402 and obtains at least one second file-dependent value for at least one stored backup file in step 404.

Thereafter, the anomalous backup file detection process 400 compares the at least one second file-dependent value to the first file-dependent values in step 406. Finally, the anomalous backup file detection process 400 performs one or more automated remedial actions in step 408 in response to a result of the comparing (e.g., in response to detecting at least one anomalous backup file).

In some embodiments, the at least one second file-dependent value for the at least one stored backup file is determined by a backup server in response to a source file corresponding to the at least one stored backup file being backed up by the backup server.

In at least one embodiment, the first file-dependent value corresponding to a given known anomalous file is obtained subsequent to a backup of a source file corresponding to the at least one stored backup file.

The particular processing operations and other network functionality described in conjunction with the flow diagram of FIG. 4 are presented by way of illustrative example only, and should not be construed as limiting the scope of the disclosure in any way. Alternative embodiments can use other types of processing operations for detection of anomalous backup files using known anomalous file fingerprints. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for detection of anomalous backup files using known anomalous file fingerprints. The foregoing applications and associated embodiments should be considered as illustrative only, and numerous other embodiments can be configured using the techniques disclosed herein, in a wide variety of different applications.

It should also be understood that the disclosed anomalous backup file detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detection of anomalous backup files using known anomalous file fingerprints may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a Function-as-a-Service FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based anomalous backup file detection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based anomalous backup file detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
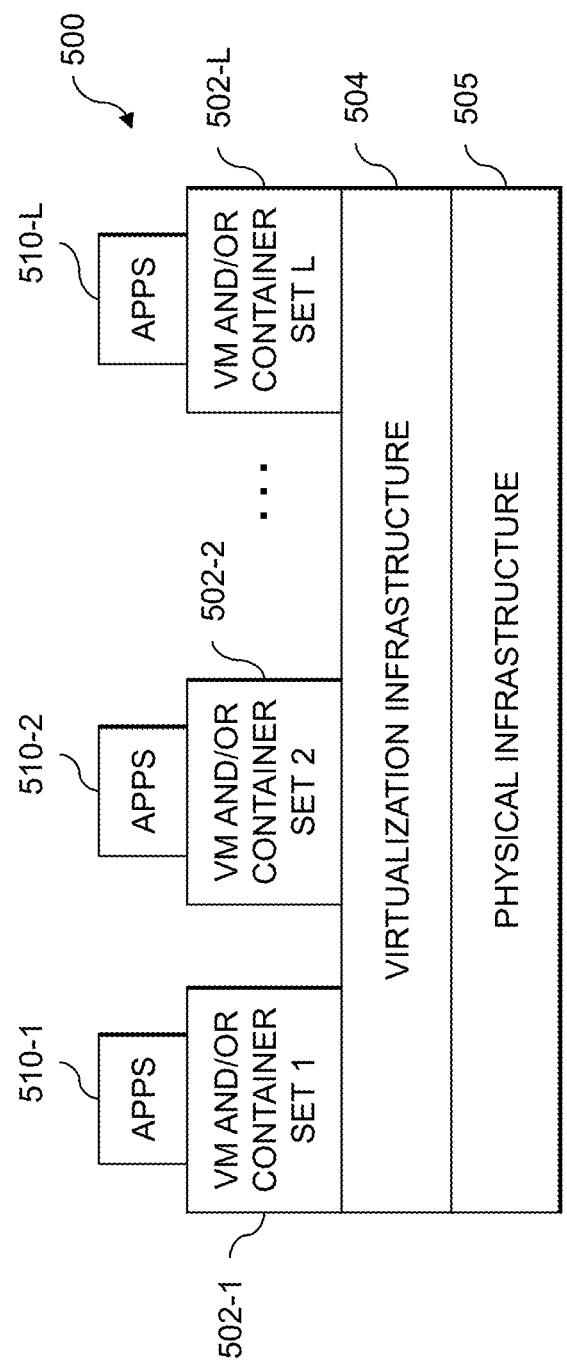
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide anomalous backup file detection functionality of the type described above for one or more processes running on a given one of the VMs. For example, each of the VMs can implement anomalous backup file detection control logic and associated functionality for comparing file-dependent values for known anomalous files to file-dependent values for stored backup files for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide anomalous backup file detection functionality of the type described above for one or more processes running on different ones of the containers. For example, a container host device supporting multiple containers of one or more container sets can implement one or more instances of backup file detection control logic and associated functionality for comparing file-dependent values for known anomalous files to file-dependent values for stored backup files.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
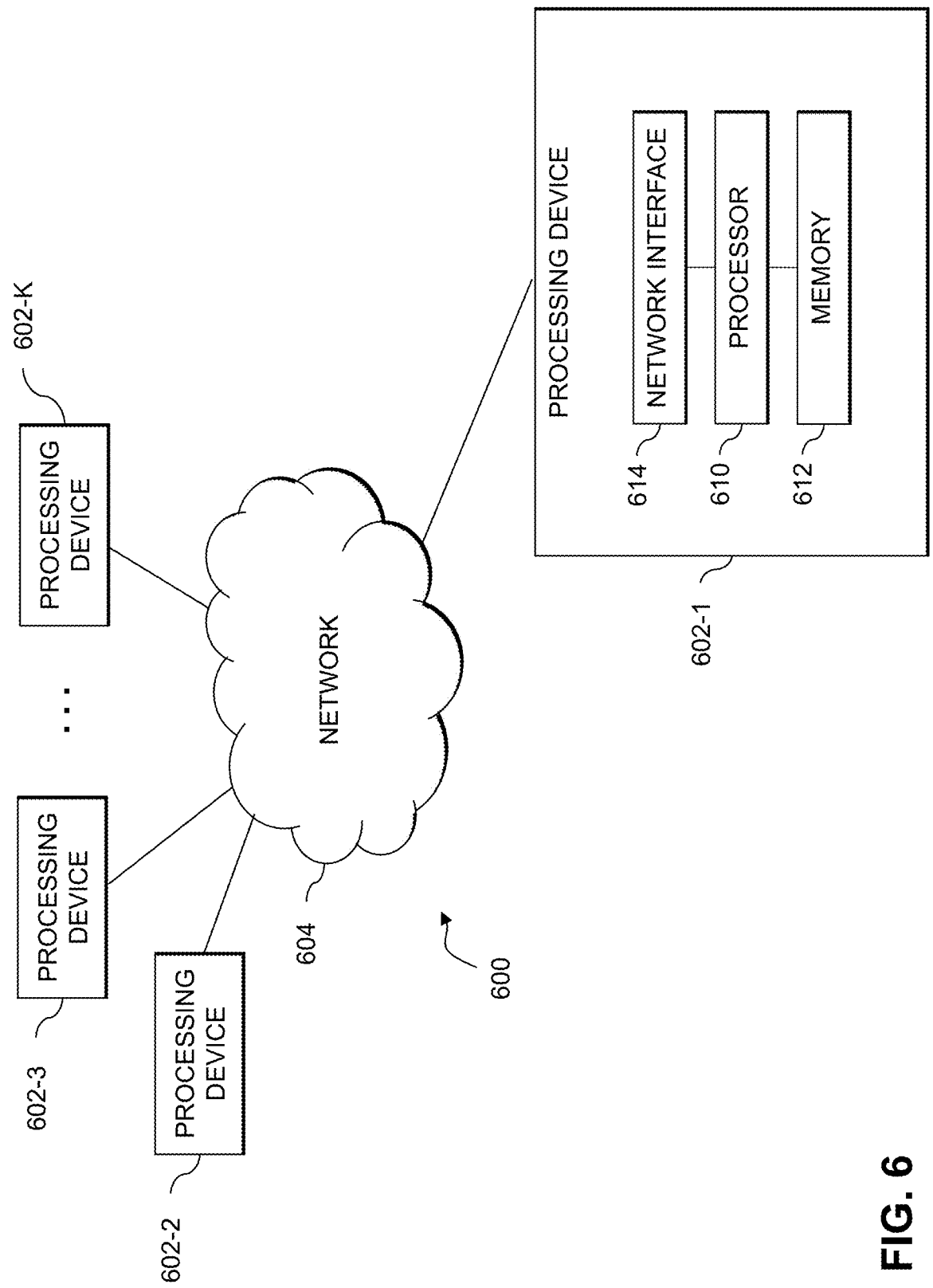
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a plurality of first file-dependent values corresponding to respective known anomalous files;
obtaining at least one second file-dependent value for at least one stored backup file, wherein the at least one second file-dependent value is computed by a backup server in response to a source file corresponding to the at least one stored backup file being backed up by the backup server, wherein the at least one second file-dependent value is based at least in part on a content of the at least one stored backup file, and wherein the at least one second file-dependent value is distinct from the at least one stored backup file;
comparing the at least one second file-dependent value to the plurality of first file-dependent values; and
performing one or more automated remedial actions in response to a result of the comparing;
wherein the method is performed by at least one processing device comprising a processor coupled to a memory.

2. The method of claim 1, wherein one or more of the plurality of first file-dependent values and the at least one second file-dependent value comprises one or more of a hash value, a signature, a digest value and a fingerprint of a corresponding file.

3. The method of claim 1, wherein the plurality of first file-dependent values is obtained from a third-party computer security provider.

4. The method of claim 1, wherein the comparing the at least one second file-dependent value to the plurality of first file-dependent values comprises scanning a plurality of the at least one second file-dependent values to identify an anomalous backup file.

5. The method of claim 1, wherein the at least one second file-dependent value for the at least one stored backup file is stored as part of metadata associated with the at least one stored backup file in connection with a backup of a source file corresponding to the at least one stored backup file.

6. The method of claim 1, wherein the one or more automated remedial actions comprise one or more of: generating an anomalous file alert notification, suspending a backup of at least one file, suspending a restore operation with respect to the at least one stored backup file and deleting the at least one stored backup file from a backup storage device.

7. The method of claim 1, wherein the first file-dependent value corresponding to a given known anomalous file is obtained, by the backup server, subsequent to a backup of a source file corresponding to the at least one stored backup file.

8. An apparatus comprising:
at least one processing device comprising a processor coupled to a memory;
the at least one processing device being configured to implement the following steps:
obtaining a plurality of first file-dependent values corresponding to respective known anomalous files;
obtaining at least one second file-dependent value for at least one stored backup file, wherein the at least one second file-dependent value is computed by a backup server in response to a source file corresponding to the at least one stored backup file being backed up by the backup server, wherein the at least one second file-dependent value is based at least in part on a content of the at least one stored backup file, and wherein the at least one second file-dependent value is distinct from the at least one stored backup file;

comparing the at least one second file-dependent value to the plurality of first file-dependent values; and performing one or more automated remedial actions in response to a result of the comparing.

9. The apparatus of claim 8, wherein one or more of the plurality of first file-dependent values and the at least one second file-dependent value comprises one or more of a hash value, a signature, a digest value and a fingerprint of a corresponding file.

10. The apparatus of claim 8, wherein the at least one second file-dependent value for the at least one stored backup file is stored as part of metadata associated with the at least one stored backup file in connection with a backup of a source file corresponding to the at least one stored backup file.

11. The apparatus of claim 8, wherein the one or more automated remedial actions comprise one or more of: generating an anomalous file alert notification, suspending a backup of at least one file, suspending a restore operation with respect to the at least one stored backup file and deleting the at least one stored backup file from a backup storage device.

12. The apparatus of claim 8, wherein the first file-dependent value corresponding to a given known anomalous file is obtained, by the backup server, subsequent to a backup of a source file corresponding to the at least one stored backup file.

13. A non-transitory processor-readable storage medium having stored therein program code of one or more software programs, wherein the program code when executed by at least one processing device causes the at least one processing device to perform the following steps:

obtaining a plurality of first file-dependent values corresponding to respective known anomalous files;

obtaining at least one second file-dependent value for at least one stored backup file, wherein the at least one second file-dependent value is computed by a backup server in response to a source file corresponding to the at least one stored backup file being backed up by the backup server, wherein the at least one second file-dependent value is based at least in part on a content of the at least one stored backup file, and wherein the at least one second file-dependent value is distinct from the at least one stored backup file;

comparing the at least one second file-dependent value to the plurality of first file-dependent values; and performing one or more automated remedial actions in response to a result of the comparing.

14. The non-transitory processor-readable storage medium of claim 13, wherein one or more of the plurality of first file-dependent values and the at least one second file-dependent value comprises one or more of a hash value, a signature, a digest value and a fingerprint of a corresponding file.

15. The non-transitory processor-readable storage medium of claim 13, wherein the at least one second file-dependent value for the at least one stored backup file is stored as part of metadata associated with the at least one stored backup file in connection with a backup of a source file corresponding to the at least one stored backup file.

16. The non-transitory processor-readable storage medium of claim 13, wherein the one or more automated remedial actions comprise one or more of: generating an anomalous file alert notification, suspending a backup of at least one file, suspending a restore operation with respect to the at least one stored backup file and deleting the at least one stored backup file from a backup storage device.

17. The non-transitory processor-readable storage medium of claim 13, wherein the first file-dependent value corresponding to a given known anomalous file is obtained, by the backup server, subsequent to a backup of a source file corresponding to the at least one stored backup file.

18. The method of claim 1, wherein the comparing is performed in response to an occurrence of a trigger event comprising a request to restore the at least one stored backup file.

19. The apparatus of claim 8, wherein the comparing is performed in response to an occurrence of a trigger event comprising a request to restore the at least one stored backup file.

20. The non-transitory processor-readable storage medium of claim 13, wherein the comparing is performed in response to an occurrence of a trigger event comprising a request to restore the at least one stored backup file.

* * * * *